United States Patent [19]
VeNard, II

[11] 3,710,230
[45] Jan. 9, 1973

[54] COMMUTATION CIRCUIT FOR POWER INVERTERS

[75] Inventor: Dan L. VeNard, II, Bonners Ferry, Idaho 83805

[73] Assignee: Gates Learjet Corporation, Wichita, Kansas

[22] Filed: Aug. 13, 1971

[21] Appl. No.: 171,754

Related U.S. Application Data

[63] Continuation of Ser. No. 868,191, Oct. 21, 1969, abandoned.

[52] U.S. Cl. .................321/45 C, 307/252 M, 321/5
[51] Int. Cl. ..............................................H02m 7/48
[58] Field of Search .......307/252 M; 321/5, 45, 45 C

[56] References Cited

UNITED STATES PATENTS 3,354,370  11/1967  Corry et al..........................321/45 C

FOREIGN PATENTS OR APPLICATIONS 6,515,907  6/1966  Netherlands............................321/5
6,510,688  2/1967  Netherlands........................321/45 C Primary Examiner—William M. Shoop, Jr.
Attorney—Richard A. Marsen

[57]  ABSTRACT

Circuit provides positive cut-off of a silicon controlled rectifier from its firing state, in rapid response to a logic pulse or signal. An individual commutation circuit is utilized for each power SCR or leg of an inverter system. Inexpensive, with relatively few electrical components for each such circuit. Simple in its operation, has substantially no internal or trapped energy losses. Commutation cut-off periods or hold-off times of the order of 15 microseconds are readily attained. A single commutating condenser is used for a pair or opposed power SCR$^s$. An inductor is arranged in series with both the power and the commutating SCR of each inverter leg, to the D.C. bus, affording substantially lower $dV/dt$ and $dI/dt$ impact thereon. In essence, a rapid yet "soft" commutation function is provided herein, whereby commercially available SCR$^s$ can be used for most power systems, over longer life periods. The circuit is adaptable for commutating SCR$^s$ in wide range of applications.

3 Claims, 3 Drawing Figures

INVENTOR,
DAN L. VENARD II

BY Richard A. Marsen
ATTORNEY

COMMUTATION CIRCUIT FOR POWER INVERTERS

This application is a continuation of Ser. No. 868,191, filed Oct. 21, 1969, and now abandoned.

BACKGROUND OF THE INVENTION

A controlled rectifier is made to conduct when a suitable gating signal or drive pulse is applied between its gate and cathode electrodes. Substantial current thereupon flows between its anode and cathode output or load circuit. The duration or cycle of such SCR conduction is generally controlled in a predetermined pattern, as through gating pulses that initiate the firing cycles, and commutation pulses that terminate them. Their composite ON periods provide the intended character and power output of the system, as in a polyphase power inverter. Such inverter is described in my U.S. Pat. No. 3,447,010 for "Synthetic Wave Three Phase Alternating Current Power Supply System," assigned to the assignee hereof.

Heretofore, commutation circuits have been rather complicated, and in general involved circulating or trapped energy therein. Such energy is wasteful, and often is destructive of the electrical circuit including the SCR$^s$. Further, the control rectifiers for both the power and commutation functions, as well as the other circuit components, required substantially higher ratings, and correspondingly cost more.

Important objectives of the commutation circuit hereof include turn-off of a firing SCR in rapid response to a cut-off signal; insuring its intended operation; and extending the life period of the SCR by substantially reducing the rate of change of the applied voltage and of the current therethrough. Substantially reducing $dV/dt$ and $dI/dt$ for the SCR$^s$, permits the use of rectifiers with lower ratings for given system applications. The commutation system of the present invention costs relatively less, because of the fewer components required, as well as their reduced ratings and size for effective operation. A reapplied voltage to the power SCR$^s$ hereof, at a rate of less than 20 volts per microsecond is readily attained, being of the order of one-tenth of that heretofore available. There is substantially no circulating energy in the commutation circuit hereof, avoiding destructive losses. The firing hold-off period and commutation circuit recycling occur within one-half of the L-C resonant period of the circuit per se.

SUMMARY OF THE INVENTION

Each power SCR of an inverter system is fired or gated by a suitable control pulse, and at the end of its intended firing period is turned-off or commutated in rapid response to a second signal. Both such signals determine the operating period or firing cycle of the rectifier. The present invention concerns commutation circuitry for effectively turning ON control rectifier to OFF. Optimum turn-off rates are generally specified for each SCR. The circuitry hereof can be readily designed and constructed to provide the requisite hold-off for most available SCR$^s$.

The commutation circuit comprises an inductor (L) placed in series between both the power SCR and the commutation SCR of each inverter leg, and the D.C. bus. The commutation capacitor ($c$) is common to the companion or opposed SCR legs of the inverter. A commutation SCR selectively connects the condenser when fully charged across the firing controlled rectifier of the pair, in response to a commutation pulse or signal. The condenser directly discharges to turn OFF that SCR. The commutation condenser is recharged just after each such discharge, in readiness for its next successive commutation phase; namely, for commutating the opposite power SCR when required to.

The series location of the commutation inductor effectively isolates the power and commutation SCR$^s$ from the reactive current diode of each bridge leg. This allows an overlap in the firing of a power SCR with its associated commutation SCR. The inductor thereby prevents failure of such rectifiers due to the reverse recovery period. The rate of rise of reapplied voltage to the SCR$^s$, as well as the current rise rate therein, are substantially softened by the series inductor. The commutation capacitor is also protected thereby, resulting in a less rated and less expensive unit for the circuit.

In operation, the charged-up capacitor is directly discharged across a firing SCR upon triggering of the commutation SCR, rapidly extinguishing its firing. Such action occurs within one-quarter of the L-C cyclic period of the commutation circuit. The condenser's discharge flows into the inductor which, during the next quarter-period, fully recharges the capacitor to the opposite polarity. The commutation capacitor is thereby in readiness for its next successive commutation phase; namely, for the companion power SCR. Hold-off times during which the power SCR is commutated or otherwise rendered non-conducting are readily effectuated in the order of 15 microseconds. The resonant period of the commutation circuit hereof is determined by practical design considerations. The aforesaid hold-off period is attained with a local frequency of 13 kilohertz, wherein the commutation inductor (L) is about 10 mixrohenries, and the capacitor (C) about 30 microfarads.

DETAILED DESCRIPTION OF THE INVENTION

The positive commutation circuitry hereof is particularly applicable to directly interrupt current flow of the firing cycles of silicon controlled rectifiers. In polyphase inverter systems, a significant number of power SCR$^s$ are utilized, 12 in the two-channel three-phase system described in the aforesaid patent. Each phase of each channel contains two corresponding or opposed control rectifiers, individually fired during alternate half-cycle periods of output alternating current, in well-known arrangement. For optimum system results, their gating or initial firing ON, and their subsequent commutation or turning OFF are controlled within relatively close timing tolerances. Towards this end, for ON gating, steep pulses of relatively short duration are applied between the gate and cathode electrodes of the respective SCR$^s$, coordinated with the gating program for the remainder of the inverter system. The turning OFF or commutation of the respective power SCR$^s$ is similarly correlated for desired system results, as will be set forth.

Figure 1:
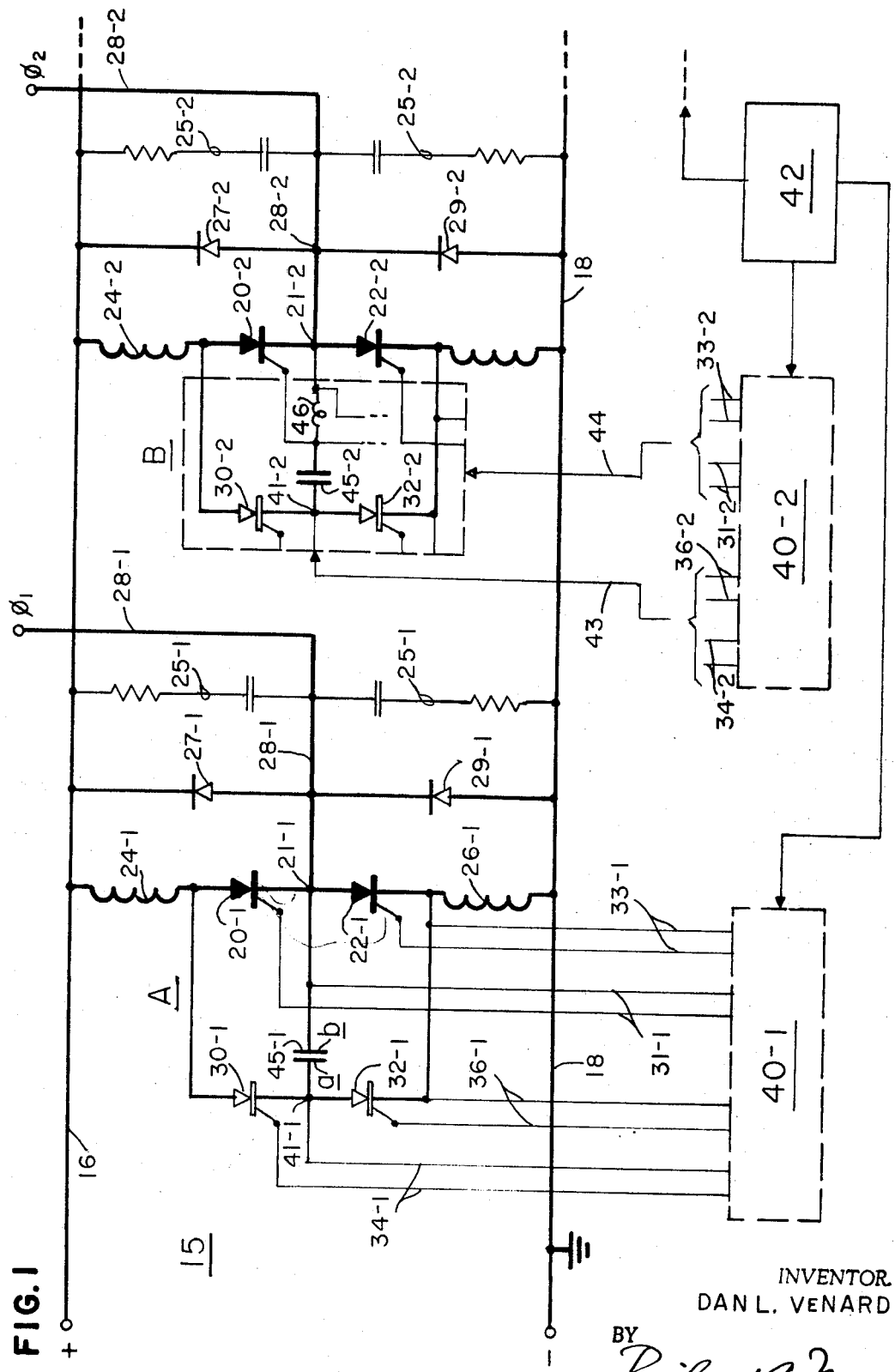
FIG. 1 is a schematic diagram of two SCR sections of a polyphase inverter system, utilizing the exemplary commutation circuitry.

In FIG. 1 the power controlled rectifiers and associated circuitry for phases A and B of a polyphase inverter 15 system are shown. Inverter 15 produces square wave current outputs in its respective phases, which for a three-phase system are respectively timed 120° apart. The resultant wave form of the output currents, as at terminals $\phi_1$ and $\phi_2$ thereof are alternate positive and negative square waves. Each such square wave is of 180° duration, in a cyclic of the predetermined power output frequency ($f_o$) as set forth in said patent. The phase section A of inverter 15 contains two opposed power SCR$^s$ 20-1 and 22-1. The anode electrode of SCR 20-1 connects to the positive DC bus 16 through series commutation inductor 24-1; that of companion SCR 22-1, through inductor 26-1 to the negative bus 18. The output line 28-1 for phase $\phi_1$ extends to point 21-1, between these SCR$^s$, connected to the cathode of 20-1 and the anode electrode of 22-1.

Freewheeling diode 27-1 is provided for reactive load current return. Diode 27-1 is connected across SCR 20-1 and inductor 24-1, being directly between output line 28-1 and positive bus 16. A similar diode 29-1 connects across output line 28-1 and negative bus 18. Conventional R-C snubber circuits 25-1 are also in shunt across each leg. The latter serve to dampen out high frequency transients that may be induced when reactive load current abruptly switches to diode 27-1 or 29-1.

The remainder of inverter circuit section A comprises gating ON and commutation OFF components. Power SCR 20-1 is triggered ON by the application of a signal pulse across its gate and cathode electrodes via leads 31-1; companion SCR 22-1, via leads 33-1. Conversely, SCR 20-1 is turned OFF in direct response to a commutation signal applied to the gate cathode-electrodes of auxiliary commutation SCR 30-1, by lead pair 34-1; and SCR 22-1, by leads 36-1 to companion SCR 32-1. The gating and commutation pulses for section A are generated in predetermined sequence by control unit 40-1. These are individual pulses of sufficient magnitude, duration and waveform for positive and rapid triggering ON of the SCR$^s$. Their method of formation in unit 40-1 is not part of the present invention, and is understood by those skilled in the art. Their sequence and timing is under the control of logic unit 42 common to the inverter system. The firing durations and their phase relation by each power SCR is thereby correlated to provide the requisite resultant output for the system. Reference is made to the above-mentioned patent for such system approach.

Commutation capacitor 45-1 completes the exemplary section A circuit. It is connected between SCR common points 21-1 and 41-1. Capacitor 45-1 is common to the commutation circuit for power SCR 20-1, as well as for companion SCR 22-1. The local resonant frequency of each such commutation circuit is substantially the same, since their respective commutation inductors 24-1 and 26-1 are made having the same inductance ($L_o$). The capacitance of capacitor 45-1 is $C_o$, which with either inductance $L_o$, determines the local commutation frequency. Capacitor 45-1, while in properly charged state, is alternately connected in series with inductors 24-1, 26-1 through the sequential firing of the associated commutation SCR$^s$ 30-1, 32-1. The commutation operation hereof is described in more detail hereinafter.

Figure 2:
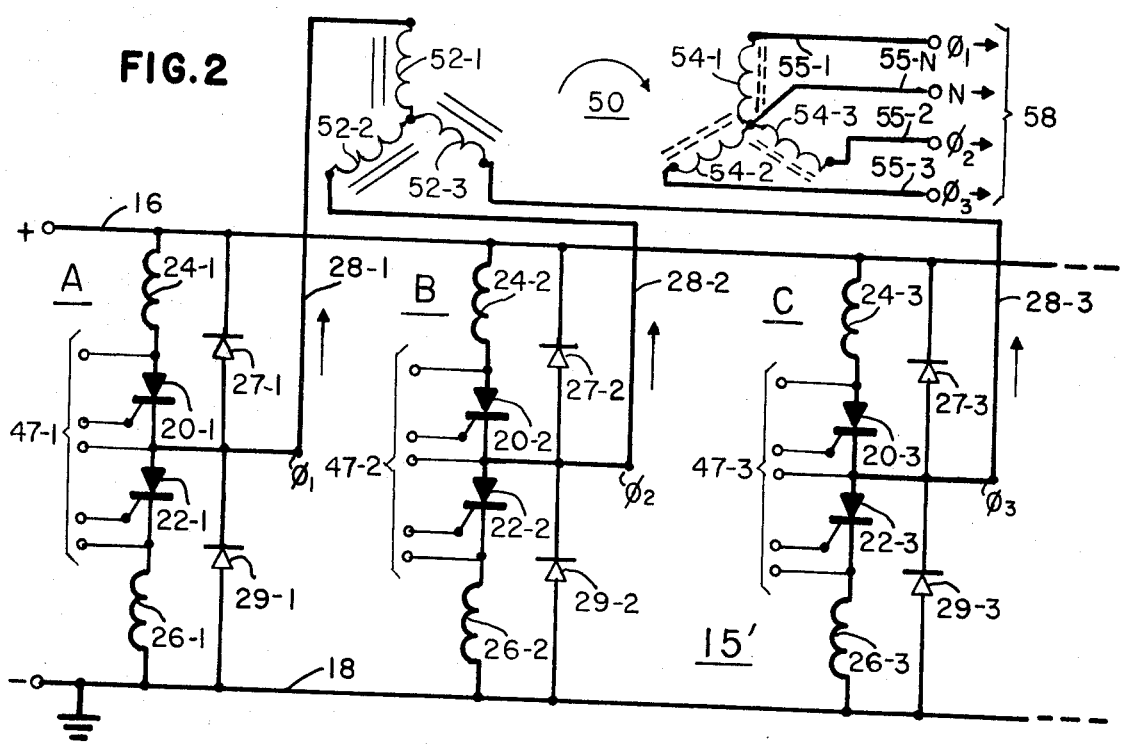
FIG. 2 is a schematic diagram of a three-phase inverter, corresponding to that of FIG. 1.

The polyphase inverter 15 may embody two balanced SCR circuit sections A and B as shown in FIG. 1; or more sections, as three, (A, B, C) illustrated in the three-phase system 15' schematically shown in FIG. 2. Each of such sections are the same circuitally, as so indicated. It is their sequential control and composite output that provides specific results. Thus, section B of inverter 15 provides phase $\phi_2$ and contains the same circuit configuration and components as those of associated section A. Towards this end, like components have the same base number, with suffix -1 in section A; and -2, for the section B parts.

The SCR gating pulses, provided by unit 40-2 are conducted, as schematically indicated: cable 43 for gates of SCR$^s$ 30-2, 32-2; cable 44, for SCR$^s$ 20-2, 22-2, in the manner of unit 40-1 for section A. The common logic pulse unit 42, is pre-controlled for proper system sequence of firing the SCR$^s$ ON and turning them OFF among the sections in well known manner. The three-phase inverter 15' (FIG. 2) contains a third similar section C, with numeral suffix -3 being used. With SCR gate control pulses applied by unit 40-1 considered as signal reference, those by unit 40-2 for section B are time-displaced by 120° therefrom; and for section C by unit 40-3 (not shown), by 240°. See referred-to patent for specific explanation thereof.

The advantageous commutation circuitry hereof is generally applicable for the individual power SCR$^s$. In the exemplary inverters, the power SCR$^s$ each have an inductor in series to their respective DC power bus connection, as clearly shown in FIGS. 1 and 2. Their gating and commutation controls determine the start and end of each firing period. These are applied as diagrammed in FIG. 1, and to their paired terminal sets indicated at 47-1, 47-2, 47-3 in FIG. 2. The square wave output of three-phase inverter 15' is shown applied to three-phase power transformer 50. The latter has three primary windings 52-1, 52-2, 52-3 in Y-connection, and corresponding secondary windings 54-1, 54-2, 54-3 coupled thereto, also in Y-arrangement with a neutral lead 55–N. Their basic three-phase output 58 is via leads 55-1, 55-2, 55-3.

An understanding of the operation of the commutation circuitry hereof is now set forth, reference being made to section A of FIG. 1. Initially let us assume that only SCR 20-1 is conducting, supplying load current through it from + bus 16, through inductor 24-1, to output $\phi_1$ cable 28-1. Also, assume that the capacitor 45-1 ($C_o$) is charge with its plate side $a$ negative (−), and $b$ positive (+). During the power half-cycle alternation through SCR 20-1 the load and terminal $\phi_1$ are effectively connected to the (+) bus 16, regardless of the direction of the load current. There is less than 1.0 volt drop through SCR 20-1 in practice, and inductor 24-1 ($L_o$) is typically 10 microhenries hereof. If the load current were reversed, the freewheeling diode 27-1 would conduct, again connecting the load terminal ($\phi_1$) and line 28-1 to the positive bus 16. The forward drop through such diodes is typically less than 1.0 volt.

When it is desired to terminate the said power half-cycle of operation (at system frequency $f_o$) it is necessary to divert the load current from the firing SCR 20-1 for sufficient time (hold-off period) for this SCR to regain its forward blocking ability, as is well known and understood in the art. It is additionally desirable to apply reverse anode-cathode bias to this off-going SCR (20-1) to assist in the rapid removal of minority carriers within the silicon structure of the SCR, thereby reducing the time required for regaining forward blocking capability. The latter objective is accomplished by removing the gate drive (at leads 31-1) to the SCR 20-1 and simultaneously gating its associated commutation SCR 30-1 into conduction (via leads 34-1) from unit 40-1. The load current is directly diverted from 20-1 through SCR 30-1 and capacitor 45-1, to cable 28-1 ($\phi_1$). Power SCR 20-1 is thereupon reverse-biased by the voltage appearing across the commutating capacitor 45-1 which has theretofore been charged to a potential essentially equal to that of the DC source; appearing at the (+) bus 16 with respect to ground per level $E_{DC}$ at 81 in FIG. 3C.

During this relatively very short commutation transient, the load current being switched can be considered to have remained constant. The commutation capacitor 45-1 supplies this current ($I_L$) plus a relatively sinusoidal component of current (61) which flows through the associated commutation inductor 24-1, see FIG. 3a. In effect, that energy stored in the commutation capacitor which is not delivered to the load is stored transiently in the commutation inductor 24-1. This "unused" energy is not "trapped," however, as is the case with prior art commutation circuits. Instead, the unique circuitry of this invention is such as to result in the transfer of this "unused" energy directly back to the commutation capacitor 45-1, and charge it to the polarity opposite that at the start of its commutation hereof. In other words, at this juncture, the polarity of plate $a$ of capacitor 45-1 is made positive (+), and plate $b$, negative (−) as shown at 83 in FIG. 3C.

The companion, on-coming power SCR 22-1 is now gated ON, by a predetermined control gate pulse, through leads 33-1 from unit 40-1. This next gating point, in relative time, is shown at 84 in FIG. 3C. Commutation capacitor 45-1 charges to the full $E_{DC}$ level, indicated as negative level 85, and is thereupon in readiness for its next successive commutation operation (on SCR 22-1). The load current, $I_L$, changes path, flowing through companion freewheeling rectifier 29-1, instead of through the subject commutation SCR 30-1, representing the transient end of the interval of the commutation of power SCR 20-1. The companion SCR 22-1 having been gated at relative time progression 91 (see FIG. 3) after the initiation of the commutation cycle for SCR 20-1 at time start 90. The interval $T_o$ between 90 and 91 is about one-half of the self-resonant frequency of the commutation L-C components 24-1, 45-1 for SCR 20-1. The hold-off period $t_o$ occurs at about half-thereof, or one-quarter of the local L-C cycle.

Figure 3:
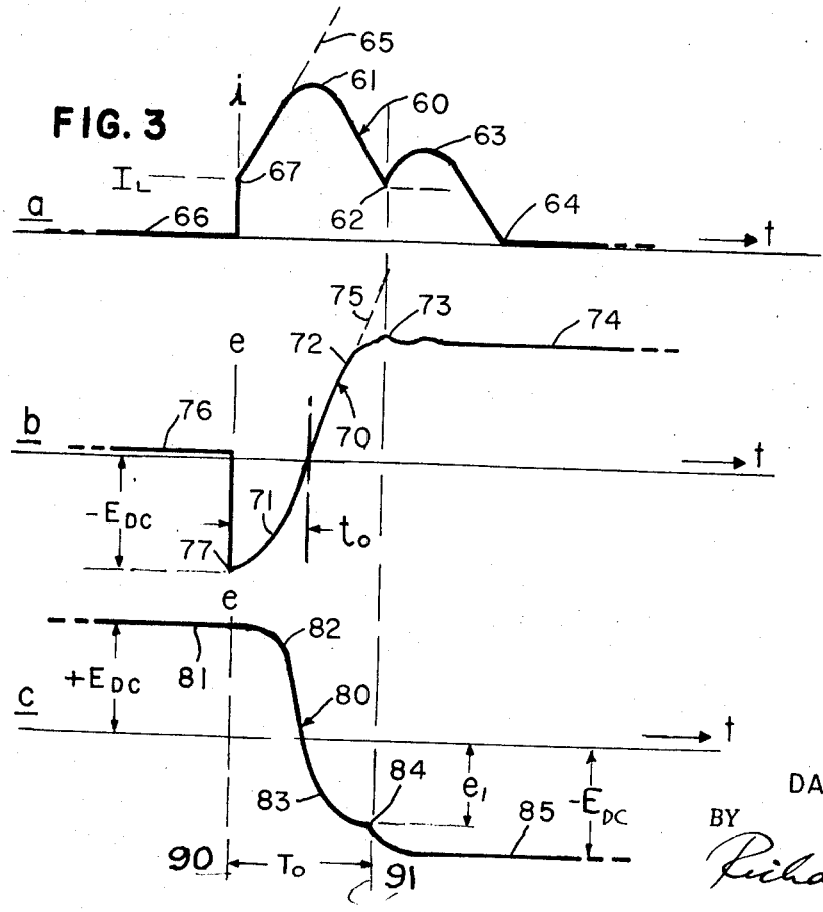
FIG. 3 illustrates transient voltage and current relationships during the commutation periods of the exemplary circuit.

FIG. 3 illustrates the pertinent voltage and current waveforms during commutation: 60, 70, 80. With the cessation of current in the commutation path, commutation in SCR 30-1 naturally turns OFF, and the load connection line 28-1 is now connected effectively to the (−) bus 18 via now fired SCR 22-1 and diode 29-1. Curve 60 of FIG. 3a is the current ($i$) of the commutation capacitor (45-1) during its commutation cycle on turning OFF power SCR 20-1, as hereinabove described. Its transient first sinusoidal discharge 61 mounts the load level ($I_L$) at point 67, and ends after $T_o$ at point 62. Its rate of change is indicated by line 65. The secondary lower current discharge 63 ends at 64 whereupon commutation SCR 30-1 turns OFF. The voltage across the off-going power SCR 20-1 is curve 70 of FIG. 7b. Its voltage drop (76) while conducting is about 1 volt, to signal start time (90). It then drops to negative $-E_{DC}$ (77), then slopes up along 71–72, through zero at hold-off time $t_o$.

The reapplied voltage 72, 73, 74 to off-going SCR 20-1 is along slope 75 at a $dV/dt$ rate that is advantageously low, as aforesaid. The minor unevenness at 73 is due to the concurrent firing start of the on-coming SCR 22-1, see 84, 85 of curve 80 of FIG. 7C. Curve 80 illustrates the voltage in real-time across capacitor 45-1 during its said commutation cycle. The hold-off time $t_o$ is in known mathematical relation with $L_o$ of inductor 24-1 (or 26-1) and $C_o$ of capacitor 45-1, as well as the ratio of the bus voltage level $E_{DC}$ and $I_L$, the instantaneous load current at time of commutation. In an exemplary 12-leg power SCR inverter system, as the three-phase two-channel circuit described in my aforesaid patent: With a DC bus level of 200 volts, a hold-off time of 16.5 microseconds was used for peak current of 250 amperes, with 60 KVA system rating. The main or power SCR$^s$ (20-1, 22-1, etc.) may be C354E$^s$, with C137M as the commutation SCR$^s$ (30-1, 32-1, etc.). The commutation inductors (24-1, 26-1, etc.) were at 10 microhenries; the commutation capacitor (45-1), 30 microhenries.

The advantageous "soft" relatively low $dV/dt$ on all the SCR$^s$ hereof permit the use of readily available, lower cost units. This is because commutation inductor (24-1, 26-1, etc.) is respectively in series between the DC bus and both of the SCR$^s$ in each leg, as described in detail hereinabove. The current rise rate $dI/dt$ through the commutation SCR$^s$ (30-1, 32-1, etc.) may be further softened by the insertion of a small inductor in the commutation condenser circuit path, as coil 46 shown with capacitor 45-2 in section B (FIG. 1).

The commutation capacitors hereof are called on for just one times the instantaneous load current plus the sinusoidal component during commutation. The invention commutation circuit returns any "unused" commutation energy to the commutation capacitor, recharging this capacitor with the correct polarity for the following commutation pulse. In particular, this energy circulation does not involve the DC link or source 16, 18 (note sinusoidal current component 61 of FIG. 3c.) Hence, high current, high-frequency "spikes" are minimized on the DC link. In summary, the inverter commutation circuit hereof represents a simple, economically attractive design which provides a reduced stress environment for the SCR or semi-conductor components, and exhibits high efficiency with low commutation energy storage requirements.

What is claimed is:

1. A polyphase inverter system to operate in the range between and including a no-load condition through an overload condition at a predetermined output frequency comprising:

a plurality of power phase circuits connected to a common direct current source;

a power control rectifier in each phase circuit;

circuit means for selectively commutating each said controlled rectifier and turn in OFF rapidly to thereby end its firing period in response to a control signal, said circuit means comprising an individual commutating inductor connected in series between a main electrode of each said controlled rectifier and directly from the direct current source, the other main electrode of each controlled rectifier connecting to its output phase terminal of the system, a commutation controlled rectifier in each individual circuit with each said power controlled rectifier, and a commutation capacitor for each power phase circuit the main electrodes of each commutation controlled rectifier and its associated capacitor being in series connection and in turn connected directly across the main electrodes of its respective power controlled rectifier; and means for selectively impressing gating pulses to each said commutation controlled rectifier to fire it and thereby directly discharge its associated capacitor to in turn electrically interact with the said inductor individually connected to the corresponding power controlled rectifier to effect a requisite hold-off period thereon and end its firing cycle.

2. A polyphase inverter system as claimed in claim 1, wherein one main electrode of each said commutation controlled rectifier is electrically connected with the individual inductor at its associated power controlled rectifier connection end, whereby said inductor softens the rate of rise of reapplied voltage to both its corresponding said power and commutating rectifiers.

3. A polyphase inverter system as claimed in claim 1, wherein the inductance and capacitance of each said associated inductor and capacitor are proportioned to have a self-resonant frequency that is substantially higher than the power system output frequency, the inverse of said frequency being equal to approximately four times the commutating hold-off period of its corresponding power controlled rectifier for positively shutting it off.

* * * * *